Figure 1:
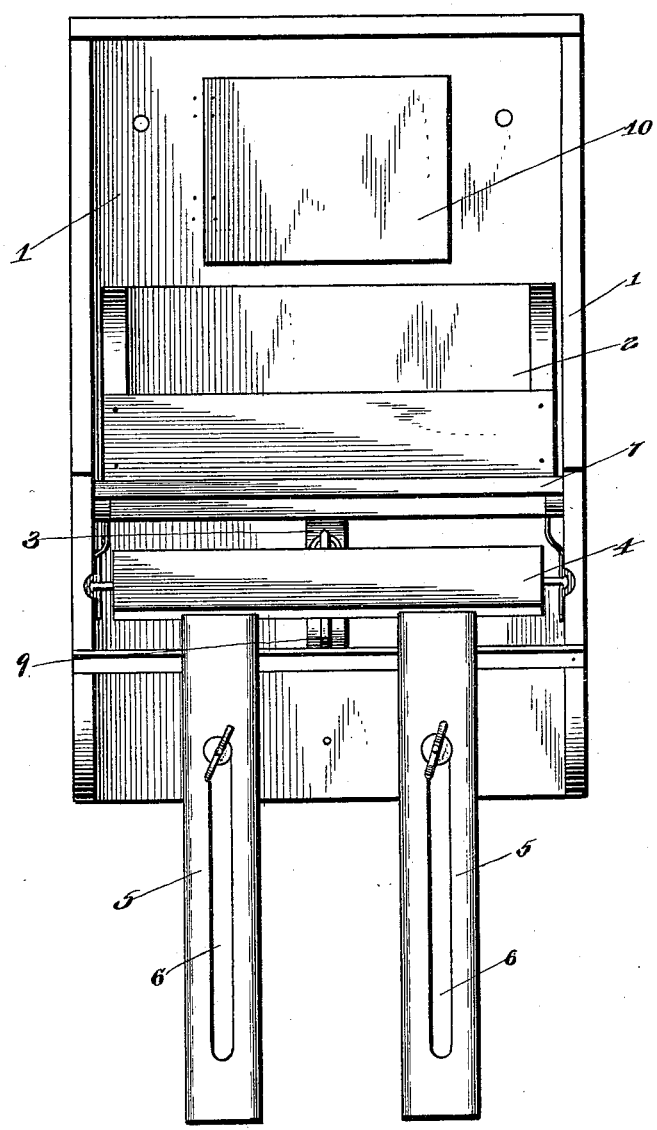

No. 611,884. Patented Oct. 4, 1898.
M. S. BARNES.
HEN'S NEST.
(Application filed June 1, 1897.)
(No Model.) 2 Sheets—Sheet 1.

Witnesses
Geo. W. Byrne
Victor J. Evans.

Inventor
Milo Smith Barnes.
By John Wedderburn.
Attorney

No. 611,884. Patented Oct. 4, 1898.
M. S. BARNES.
HEN'S NEST.
(Application filed June 1, 1897.)
(No Model.) 2 Sheets—Sheet 2.
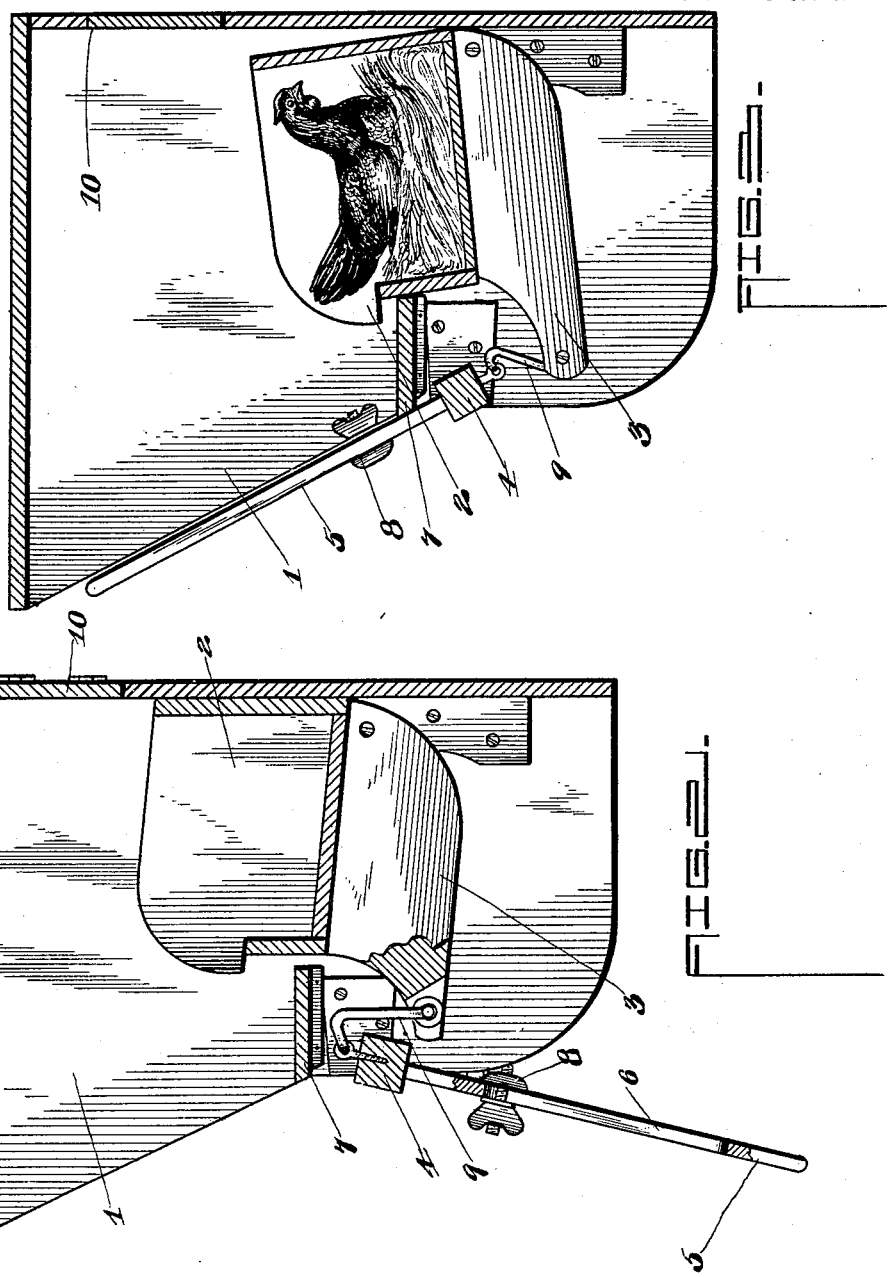
Witnesses
Geo. A. Lynne
Victor J. Evans
Inventor
Milo Smith Barnes.
By John Wedderburn.
Attorney

UNITED STATES PATENT OFFICE.

MILO SMITH BARNES, OF GARNER, IOWA.

HEN'S NEST.

SPECIFICATION forming part of Letters Patent No. 611,884, dated October 4, 1898.

Application filed June 1, 1897. Serial No. 638,838. (No model.)

*To all whom it may concern:*

Be it known that I, MILO SMITH BARNES, of Garner, in the county of Hancock and State of Iowa, have invented certain new and useful Improvements in Automatic Hens' Nests; and I do hereby declare the following to be a full, clear, and exact description of the invention, such as will enable others skilled in the art to which it appertains to make and use the same.

My invention relates to hens' nests, the object of which is to allow only one hen to rest upon the same nest at the same time.

My invention consists of certain novel features of construction and combinations of parts hereinafter fully described and claimed.

In the accompanying drawings, Figure 1 is a front view of my device. Fig. 2 is a section on the central line thereof, showing the position assumed by the door when the nest is empty. Fig. 3 is a similar view showing the position assumed by the door when there is a hen on.

The numeral 1 indicates the casing of my device, which is preferably formed as a rectangular box having a projecting hood in front thereof. The nest-box 2 is pivoted at the back portion to said casing 1. This pivoting permits the front of said box to be raised or lowered. The casing 1 is so formed that the nest can only be approached from the front. An arm 3 extends downward from the bottom of said nest, and a bar 4 is pivotally mounted upon said casing in front of said nest. Fingers 5, provided with slots 6 therein, are held upon this bar. A platform 7 is provided immediately in front of the nest-box 2 and above the bar 4. Weights 8 are adjustably held in the slots 6. A link 9 connects said bar with the projections 3 upon the box. This link is so adjusted that if the box is raised or lowered the bar will be rocked. A door 10 is secured in any desired manner to the back of the box, being adapted for the removal of the eggs from the nest-box.

It will now be noted from Figs. 2 and 3 of the drawings that when a hen steps upon the nest-box the bar 4 rotates and the fingers 5 close up behind her, thus preventing the entrance of a second hen. When the hen desires to leave the nest, she naturally steps upon the platform 7, which permits the fingers to fall and raises the box ready for action a second time. It will also be noted that by means of the adjustable weights the nest may be regulated for the weight of any breed of hens, it being of course necessary to have some means to prevent too violent motion of the finger-bar and which will yet operate upon the nest being occupied by a light hen.

I thus provide a simple and efficient device well adapted for the purpose indicated and which may be manufactured at a low cost.

It is obvious that many minor changes may be made in the form of my device without departing from the essential principles thereof. I do not therefore desire to confine myself to the exact form herein shown and described, but wish to include all such as properly come within the scope of my invention. For instance, I may extend the sides of my device over the platform 7 in order to prevent the nest-box from dropping in case it should be disconnected in any manner. It is also obvious that this device can be made up in sections of as many boxes as may be desired.

Having thus described my invention, what I claim as new, and desire to secure by Letters Patent, is—

1. A hen's nest comprising a casing, a rocking nest-box, the connecting-link, the rocking gate-fingers arranged for operation by said nest-box through said link and to guard the entrance thereto, said gate-fingers being provided with longitudinal slots, and weights adjustable in said slots such weights being provided with means whereby they may be held in any desired adjustment substantially as and for the purpose set forth.

2. The improved nest herein described comprising the casing, the fixed shelf, the rocking nest-box having its side pieces undercut at their rear ends providing extensions forming stop projections overlapping the fixed shelf, the rocking bar provided with gate-fingers controlling the entrance to the nest and provided with longitudinal slots, the weights adjustable in said slots, and the link connecting the nest-box and the rocking bar substantially as shown and described.

In testimony whereof I have signed this specification in the presence of two subscribing witnesses.

MILO SMITH BARNES.

Witnesses:
   G. E. TROEGER,
   E. C. ABBEY.